United States Patent
Ito

(10) Patent No.: US 12,549,053 B2
(45) Date of Patent: Feb. 10, 2026

(54) STATOR

(71) Applicant: NHK SPRING CO., LTD., Yokohama (JP)

(72) Inventor: Keiichi Ito, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 193 days.

(21) Appl. No.: 18/261,242

(22) PCT Filed: Jan. 11, 2022

(86) PCT No.: PCT/JP2022/000588
§ 371 (c)(1),
(2) Date: Jul. 12, 2023

(87) PCT Pub. No.: WO2022/168538
PCT Pub. Date: Aug. 11, 2022

(65) Prior Publication Data
US 2024/0333068 A1 Oct. 3, 2024

(30) Foreign Application Priority Data
Feb. 5, 2021 (JP) ................................. 2021-017703

(51) Int. Cl.
*H02K 3/52* (2006.01)
*H02K 1/16* (2006.01)
(Continued)

(52) U.S. Cl.
CPC ............. *H02K 3/521* (2013.01); *H02K 1/16* (2013.01); *H02K 3/28* (2013.01); *H02K 3/38* (2013.01); *H02K 2203/09* (2013.01)

(58) Field of Classification Search
CPC ........... H02K 3/521; H02K 1/16; H02K 3/28; H02K 3/38; H02K 15/066; H02K 2203/09
See application file for complete search history.

(56) References Cited

U.S. PATENT DOCUMENTS 8,018,104 B2 * 9/2011 Yagai ..................... H02K 3/522
310/71
8,230,580 B2 * 7/2012 Kiyono .................. H02K 15/12
310/43
(Continued)

FOREIGN PATENT DOCUMENTS

EP 1067003 A2 * 1/2001 ............... B60K 6/40
JP 2012231561 A * 11/2012
(Continued)

OTHER PUBLICATIONS

International Search Report issued in the corresponding International Patent Application No. PCT/JP2022/000588, dated Mar. 1, 2022 in 4 pages including English translation.
(Continued)

*Primary Examiner* — Jeremy A Luks
(74) *Attorney, Agent, or Firm* — Knobbe, Martens, Olson & Bear, LLP

(57) ABSTRACT

In a stator, one end portion of each coil is disposed on the root side of each tooth, and other end portion of the coil is disposed on the tip end side of the tooth. A first bus bar disposed on one side in the axial direction with respect to a stator core has each of a plurality of first joining portions each extended toward the root side of each tooth and joined to the one end portion of each coil. A second bus bar disposed on one side or the other side in the axial direction with respect to the stator core has each of a plurality of second joining portions each extended toward the tip end side of each tooth and joined to the other end portion of each coil.

11 Claims, 11 Drawing Sheets

(51) Int. Cl.
*H02K 3/28* (2006.01)
*H02K 3/38* (2006.01)

(56) References Cited

U.S. PATENT DOCUMENTS

| | | | |
|---|---|---|---|
| 8,250,734 B2* | 8/2012 | Fubuki | H02K 15/066 |
| | | | 29/598 |
| 2002/0047451 A1 | 4/2002 | Weimer | |
| 2003/0094876 A1* | 5/2003 | Hsu | H02K 15/066 |
| | | | 310/185 |
| 2009/0140595 A1* | 6/2009 | Naganawa | H02K 3/522 |
| | | | 310/201 |
| 2014/0015349 A1* | 1/2014 | Chamberlin | H02K 3/345 |
| | | | 310/43 |
| 2015/0123503 A1 | 5/2015 | Hashimoto et al. | |
| 2020/0195075 A1 | 6/2020 | Hishida et al. | |
| 2020/0280232 A1 | 9/2020 | Natsumeda et al. | |
| 2021/0021169 A1* | 1/2021 | Hong | H02K 3/38 |
| 2021/0021171 A1* | 1/2021 | Hong | H02K 3/345 |

FOREIGN PATENT DOCUMENTS

| | | |
|---|---|---|
| JP | 2014-011937 A | 1/2014 |
| JP | 2014-064361 A | 4/2014 |
| JP | 2017-099210 A | 6/2017 |
| JP | 2020-022326 A | 2/2020 |
| JP | 2020-145916 A | 9/2020 |
| WO | WO-2014011783 A1 * | 1/2014 ............ H02K 15/10 |
| WO | 2018/190124 A1 | 10/2018 |

OTHER PUBLICATIONS

Written Opinion issued in the corresponding International Patent Application No. PCT/JP2022/000588, dated Feb. 15, 2022 in 4 pages.

Extended European Search Report issued in EP Application No. 22749415.0, dated Apr. 2, 2025.

* cited by examiner

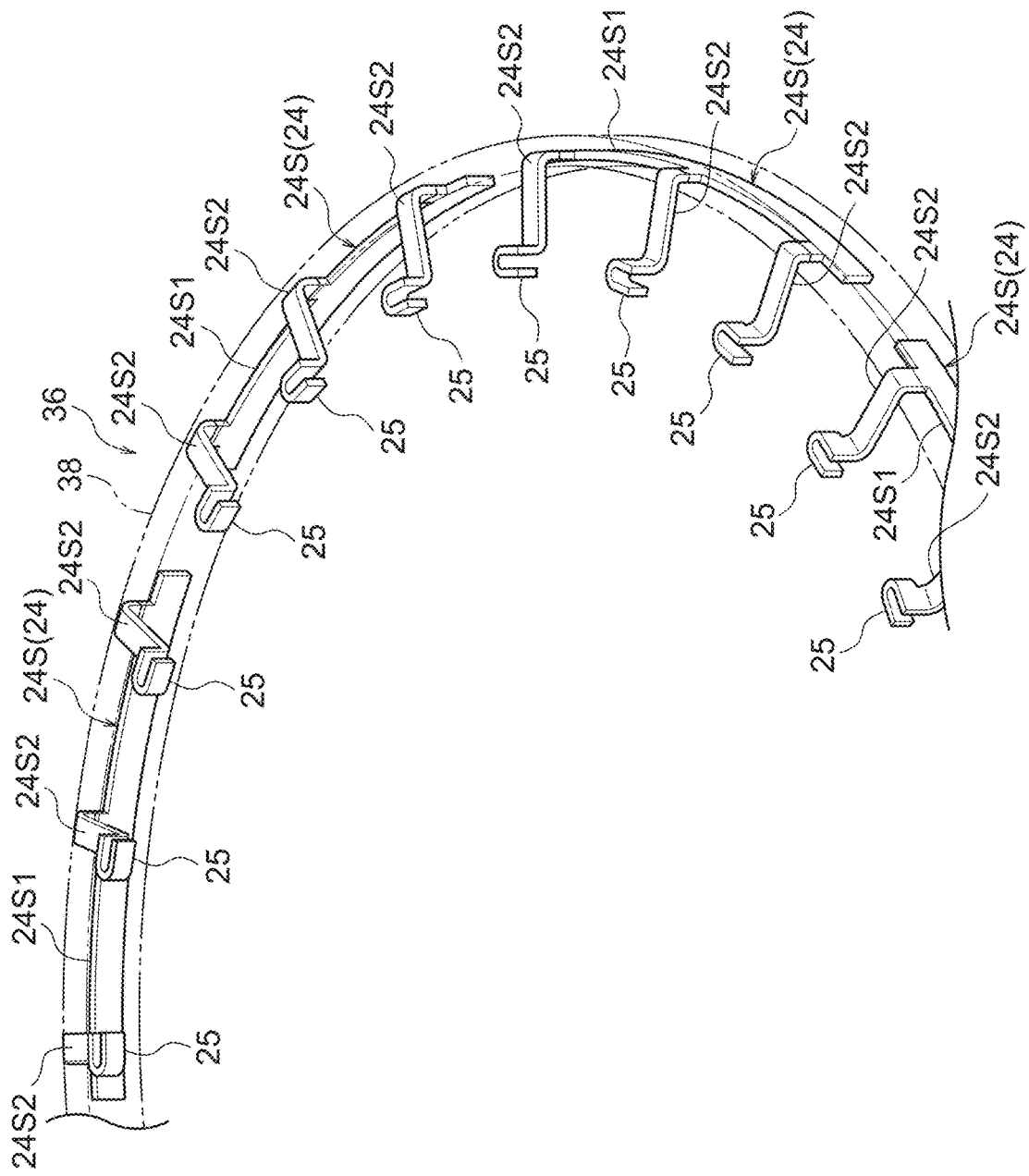

STATOR

CROSS-REFERENCE TO RELATED APPLICATIONS

This application is the U.S. National Phase under 35. U.S.C. § 371 of International Application PCT/JP2022/000588, filed Jan. 11, 2022, which claims priority to Japanese Patent Application No. 2021-017703, filed Feb. 5, 2021. The disclosures of the above-described applications are hereby incorporated by reference in their entireties.

TECHNICAL FIELD

The present disclosure relates to a stator of a motor.

BACKGROUND ART

The stator disclosed in Japanese Patent Application Laid-Open (JP-A) No. 2014-11937 has a stator core, and plural coils mounted to the stator core. The coils have winding portions formed from rectangular conductors and wound around the teeth of the stator core, final end portions led-out from the outer side end portions of the winding portions, and bus bar portions led-out from the inner side end portions of the winding portions. The outer side end portions of the winding portions are disposed at the root sides of the teeth, and the final end portions that are led-out from these outer side end portions are disposed at the outer peripheral side of the yoke of the stator core. The inner side end portions of the winding portions are disposed at the distal end portion sides of the teeth, and the aforementioned bus bar portions are routed from these inner side end portions to the outer peripheral side of the yoke. These bus bar portions are joined to the final end portions of other coils.

The motor disclosed in JP-A No. 2020-145916 has plural stator members and a bus bar member. Coils are wound around the plural stator members respectively, and the stator members are arrayed in an annular form as seen from the axial direction of the motor. The both end portions of each coil are led-out to the outer peripheral sides of the stator members and are joined to the bus bar member. This bus bar member has an annular base portion, and a connection terminal that extends out from the base portion to the outer peripheral side of the stator member. The both end portions of the coils are inserted through two concave portions formed at the connection terminal.

SUMMARY OF INVENTION

Technical Problem

In the prior art techniques disclosed in the above-described, respective publications, both end portions of each coil are led-out to the outer peripheral side of the yoke. Particularly in the case of coils that are thick wires, in such a structure, after the process of winding the coils around the teeth, there is the need for a process of routing the end portions of the coils, which have been wound around to the distal end sides of the teeth, to the outer peripheral side of the yoke. As a result, this is the cause of, for example, an increase in the manufacturing cost, a deterioration in workability, deterioration in the dimensional accuracy of the coils, and the like.

In view of the above-described circumstances, an object of the present disclosure is to provide a stator in which there is no need for a process of routing the end portions of coils, which have been wound around to the distal end sides of teeth, to the outer peripheral side of a yoke.

Solution to Problem

A stator of a first aspect comprises: a stator core having a yoke and a plurality of teeth: a plurality of coils wound around the plurality of teeth respectively, respective one end portions of the plurality of coils being disposed at root sides of the teeth respectively, and respective other end portions of the plurality of coils being disposed at distal end sides of the teeth respectively, a first bus bar disposed at an axial direction one side with respect to the stator core, having a first extending portion extending in a peripheral direction of the stator core along the yoke, and having a plurality of first joining portions that extend out from the first extending portion toward the root sides of the teeth respectively and to which the one end portions of the coils are joined respectively; and a second bus bar disposed in an axial direction with respect to the stator core, having a second extending portion extending in the peripheral direction of the stator core along the yoke, and having a plurality of second joining portions that extend out from the second extending portion toward the distal end sides of the teeth respectively and to which the other end portions of the coils are joined respectively.

In the stator of the first aspect, coils are wound respectively around the plural teeth of the stator core, respectively. One end portions of the respective coils are disposed at the root sides of the respective teeth, and the other end portions of the respective coils are disposed at the distal end sides of the respective teeth. The first bus bar is disposed at an axial direction one side with respect to the stator core. The first bus bar has the first extending portion that extends in the peripheral direction of the stator core along the yoke of the stator core. The plural first joining portions extend out from the first extending portion toward the root sides of the respective teeth. The one end portions of the respective coils are joined to the plural first joining portions. The second bus bar is disposed at the one side or at the another side in the axial direction with respect to the stator core. The second bus bar has the second extending portion that extends in the peripheral direction of the stator core along the yoke. The plural second joining portions extend out from the second extending portion toward the distal end sides of the respective teeth. The other end portions of the respective coils are joined to the plural second joining portions. Because the second joining portions of the second bus bar extend out toward the distal end sides of the teeth and are joined to the other end portions of the respective coils in this way, a process for routing the other end portions of the respective coils, which have been wound around to the distal end sides of the teeth, to the outer peripheral side of the yoke is unnecessary.

In a stator of a second aspect, in the first aspect, the second bus bar is disposed at an axial direction another side with respect to the stator core.

In the stator of the second aspect, the first bus bar is disposed at an axial direction one side with respect to the stator core, and the second bus bar is disposed at the axial direction another side with respect to the stator core. Because the first bus bar and the second bus bar are disposed so as to be dispersed at the both sides in the axial direction with respect to the stator core in this way, it is easy to cool the respective bus bars.

A stator of a third aspect comprises, in the second aspect, a first insulator that is insulating and thermally conductive, and that holds the first extending portion; and a second insulator that is insulating and thermally conductive, and that holds the second extending portion.

In accordance with the stator of the third aspect, the first extending portion of the first bus bar, which is disposed at an axial direction one side with respect to the stator core, is held by the first insulator that is insulating and thermally conductive. The second extending portion of the second bus bar, which is disposed at the axial direction another side with respect to the stator core, is held by the second insulator that is insulating and thermally conductive. The heat of the first bus bar and the second bus bar can be dissipated via the first insulator and the second insulator.

In a stator of a fourth aspect, in the first aspect, the second bus bar is disposed at the axial direction one side with respect to the stator core.

In the stator of the fourth aspect, the first bus bar and the second bus bar are disposed at an axial direction one side with respect to the stator core. Because both the first bus bar and the second bus bar are collectively disposed at one side in the axial direction with respect to the stator core, a unit of the first bus bar and the second bus bar can be made integral, and the manufacturing cost can be reduced. Further, because the joining of the respective bus bars and the respective coils can be carried out at only one axial direction side of the stator core, the assembly processes and the setting-up of the stator can be simplified.

A stator of a fifth aspect comprises, in the fourth aspect, an insulator that is insulating and thermally conductive, and that holds the first extending portion and the second extending portion.

In the stator of the fifth aspect, the first bus bar and the second bus bar, which are disposed at one side in the axial direction with respect to the stator core, are collectively held by the insulator that is insulating and thermally conductive. The heat of the first bus bar and the second bus bar can be dissipated via this insulator.

In a stator of a sixth aspect, in any one aspect of the first aspect through the fifth aspect, a U-phase coil, a V-phase coil and a W-phase coil are included in the plurality of coils, a U-phase bus bar, a V-phase bus bar and a W-phase bus bar are included in the first bus bar, and the U-phase bus bar, the V-phase bus bar and the W-phase bus bar have a U-phase terminal portion, a V-phase terminal portion and a W-phase terminal portion respectively, which are connected to a three-phase power source.

In the stator of the sixth aspect, one end portions of the U-phase coil, the V-phase coil and the W-phase coil are joined to the U-phase bus bar, the V-phase bus bar and the W-phase bus bar that are included in the first bus bar. The other end portions of the U-phase coil, the V-phase coil and the W-phase coil are connected to the second bus bar. The U-phase terminal portion, the V-phase terminal portion and the W-phase terminal portion of the U-phase bus bar, the V-phase bus bar and the W-phase bus bar are connected to a three-phase power source. Due thereto, the present stator can function as the stator of a three-phase motor.

Advantageous Effects of Invention

As described above, in the stator relating to the present disclosure, there is no need for a process of routing the end portions of coils, which have been wound around to the distal end sides of teeth, to the outer peripheral side of a yoke.

BRIEF DESCRIPTION OF DRAWINGS

FIG. 11 is a perspective view illustrating a portion of a second bus bar unit of the stator relating to the second embodiment.

DESCRIPTION OF EMBODIMENTS

First Embodiment

Figure 1:
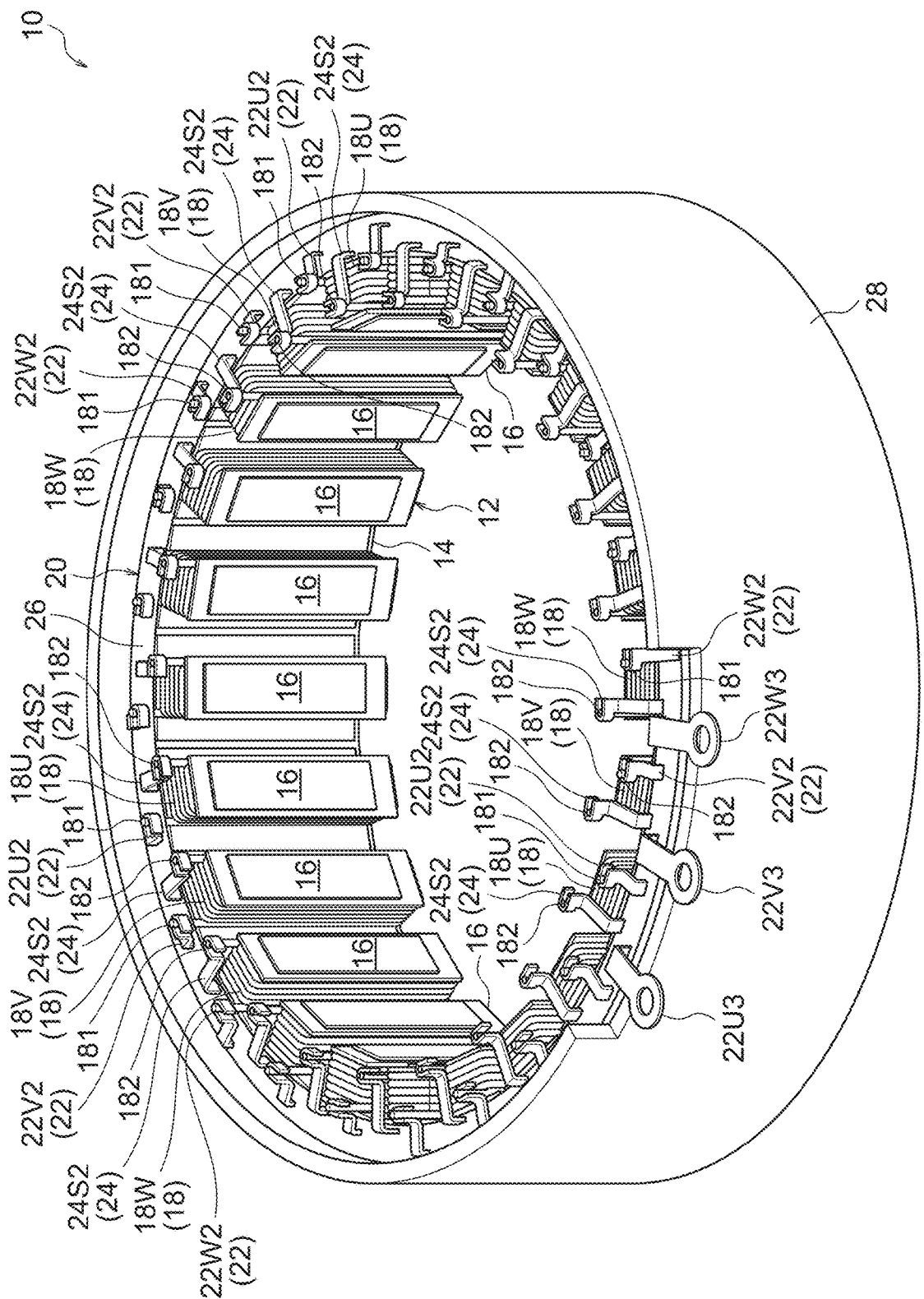
FIG. 1 is a perspective view illustrating a stator relating to a first embodiment.

A stator 10 relating to a first embodiment of the present disclosure is described hereinafter by using FIG. 1 through FIG. 5. Note that, in the respective drawings, the scale of the drawings is changed as appropriate. Further, in the respective drawings, there are cases in which some of the reference numerals are omitted for ease of understanding of the drawings.

As illustrated in FIG. 1 through FIG. 4, the stator 10 relating to the present embodiment is an armature (stator) having a stator core 12, plural (here, 24) coils 18, and a bus bar unit 20. The stator core 12, the plural coils 18 and the bus bar unit 20 are accommodated within a cylindrical tube shaped case 28. An unillustrated rotor is disposed at the inner side of the stator 10, and an inner-rotor-type motor (rotary electrical machine) is structured. As an example, this motor is a three-phase motor.

The stator core 12 is structured by plural iron core pieces, which are formed from electromagnetic steel plates, being layered. The stator core 12 is annular and has a yoke 14 and plural (here, 24) teeth 16. The yoke 14 is cylindrical tube shaped. The plural teeth 16 are formed so as to project-out from the inner peripheral surface of the yoke 14 toward the inner side in the radial direction of the stator core 12. The plural teeth 16 are formed so as to be lined-up at a uniform interval in the peripheral direction of the stator core 12, and slots (reference numerals not given thereto) are respectively formed between the plural teeth 16. This stator 10 is fit together with the inner side of the case 28. Note that the number of poles and the number of slots of the stator 10 illustrated in FIG. 1 through FIG. 4 are merely examples, and the numbers are not limited to these.

Figure 5:
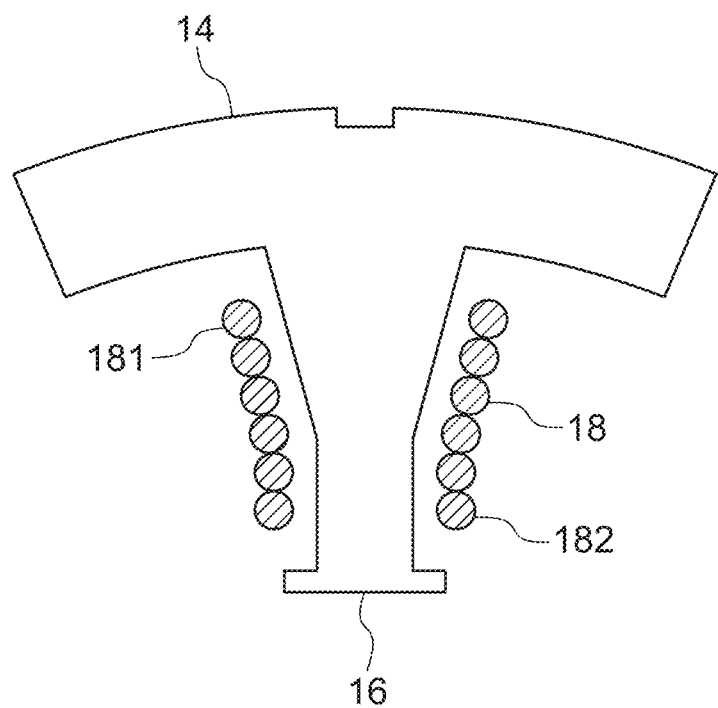
FIG. 5 is a cross-sectional view illustrating a partial structure of the stator relating to the first embodiment.

The plural coils 18 are wound in spiral forms around the plural teeth 16, respectively. An insulating body such as an insulator, insulating paper or varnish or the like is interposed between the respective coils 18 and the respective teeth 16. Each coil 18 is a structure in which an element wire formed from, for example, copper, aluminum, silver or an alloy wire material thereof, is covered by an insulating body of enamel or the like. This element wire is a round wire here, but may be a rectangular wire or a hexagonal wire or the like. As seen from the radial direction of the stator core 12, the coil 18 is wound in a substantially elongated rectangular form that is long in the axial direction of the stator core 12. As illustrated in FIG. 5, at the coil 18, one end portion 181 that is the end portion at the start of winding is disposed at the root side of the tooth 16, and another end portion 182 that is the end portion at the end of winding is disposed at the distal end side of the tooth 16. The one end portion 181 and the another end portion 182 both extend toward one side in the axial direction of the stator core 12. Note that the number of the coils 18 that are wound may be one, or may be two or more.

The plural coils 18 are structured by plural (here, eight) U-phase coils 18U, plural (here, eight) V-phase coils 18V, and plural (here, eight) W-phase coils 18W. The U-phase coils 18U, the V-phase coils 18V and the W-phase coils 18W are successively arrayed in that order along the peripheral direction of the stator core 12. The respective U-phase coils 18U, the respective V-phase coils 18V, and the respective W-phase coils 18W are mounted to the teeth 16 of the stator core 12, with an interval therebetween in the peripheral direction of the stator core 12. Further, adjacent coils of the same phase (the same phase among the U phase, the V phase or the W phase) are electrically connected by the bus bar unit 20.

Figure 6:
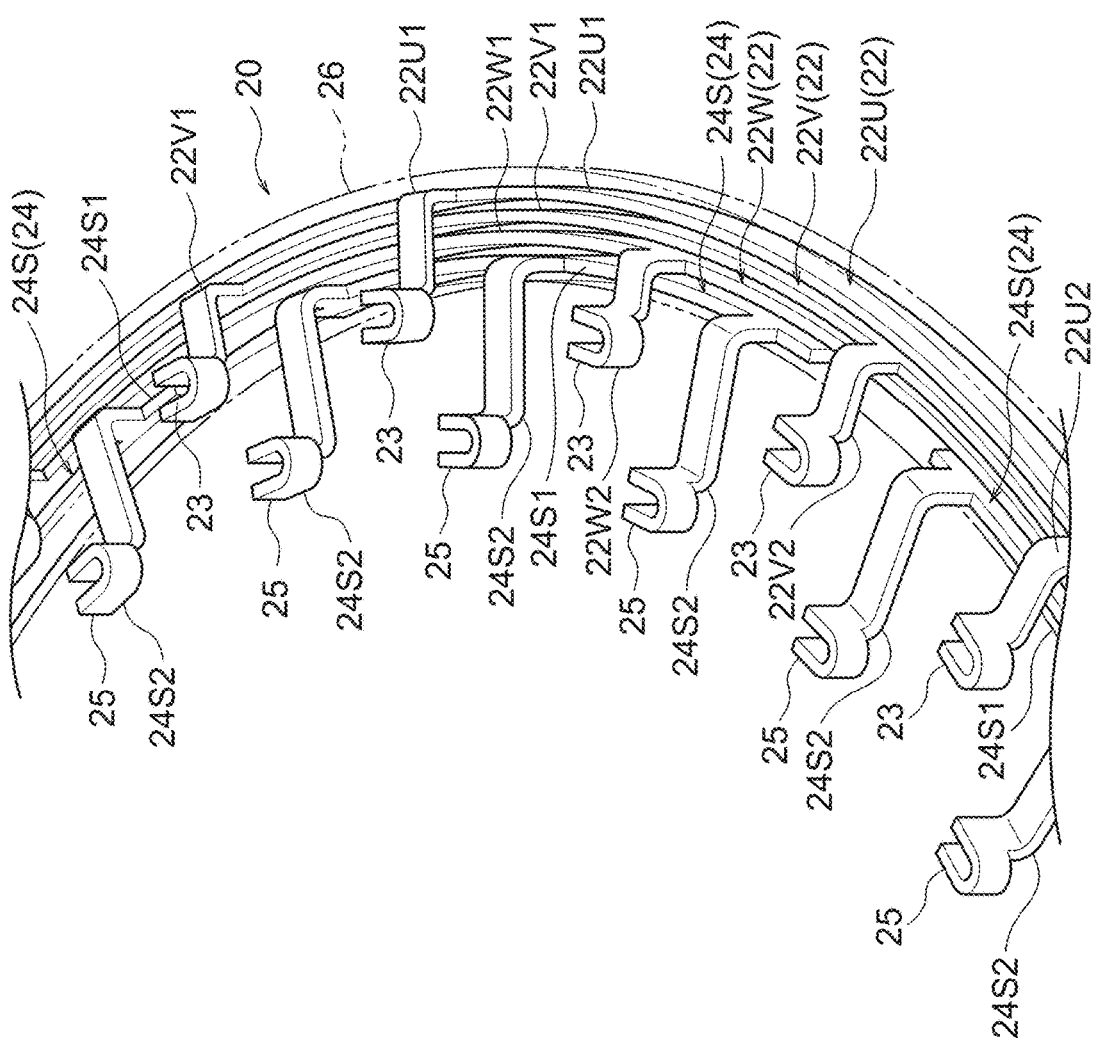
FIG. 6 is a perspective view illustrating a portion of a bus bar unit of the stator relating to the first embodiment.

As illustrated in FIG. 1 through FIG. 4, the bus bar unit 20 is disposed at one side in the axial direction with respect to the stator core 12. As illustrated in FIG. 6, the bus bar unit 20 has a first bus bar 22, a second bus bar 24 and an insulator 26. The first bus bar 22 is structured by a U-phase bus bar 22U, a V-phase bus bar 22V and a W-phase bus bar 22W. The second bus bar 24 is structured by plural (here, eight) bus bar segments 24S as an example. The U-phase bus bar 22U, the V-phase bus bar 22V, the W-phase bus bar 22W and the bus bar segments 24S are, as an example, manufactured by metal plates being press-molded, but are not limited to this. For example, there may be a structure in which, in the same way as the coils 18, the U-phase bus bar 22U, the V-phase bus bar 22V, the W-phase bus bar 22W and the bus bar segments 24S are manufactured by round wires.

Figure 2:
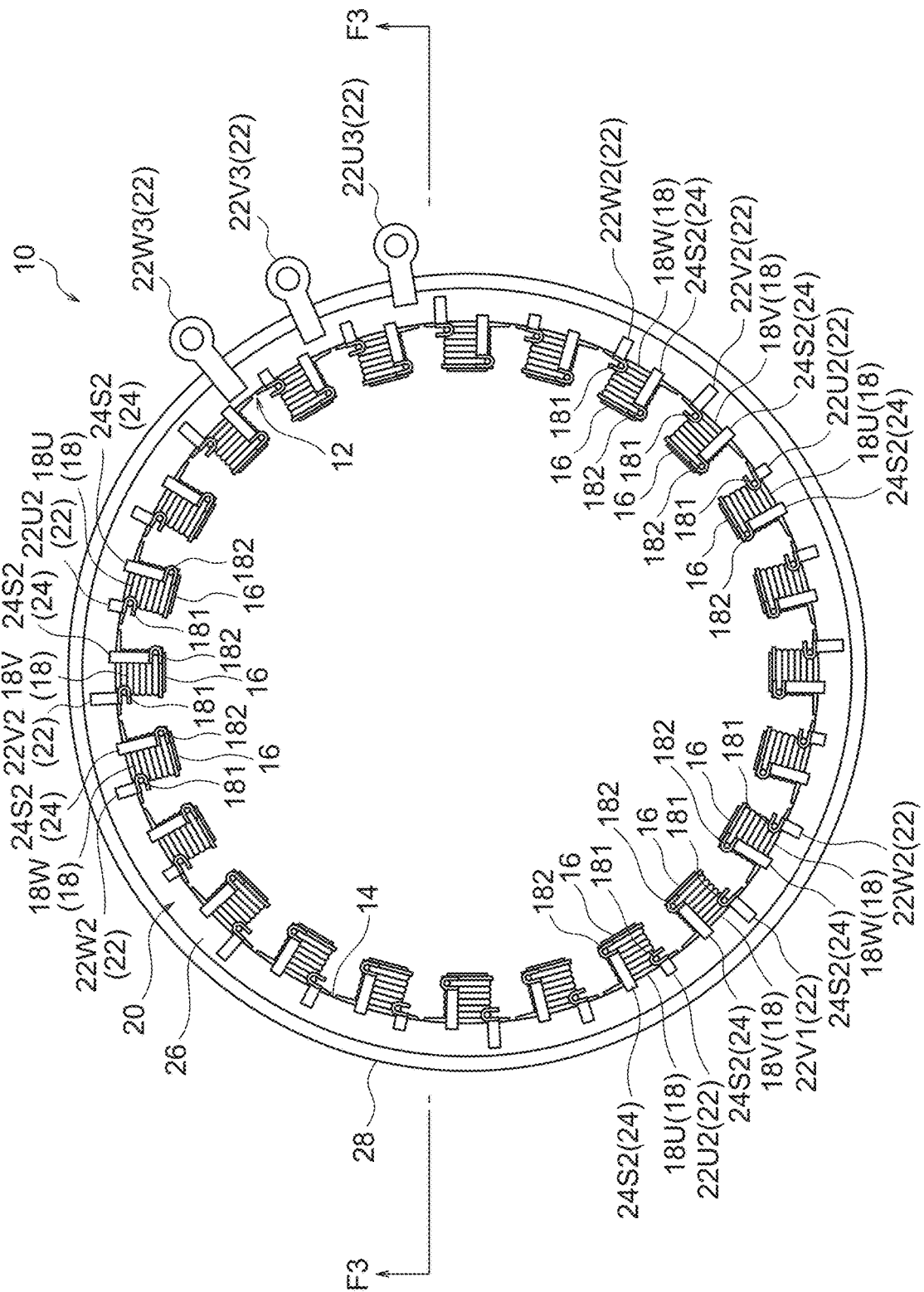
FIG. 2 is a plan view illustrating the stator relating to the first embodiment.
Figure 3:
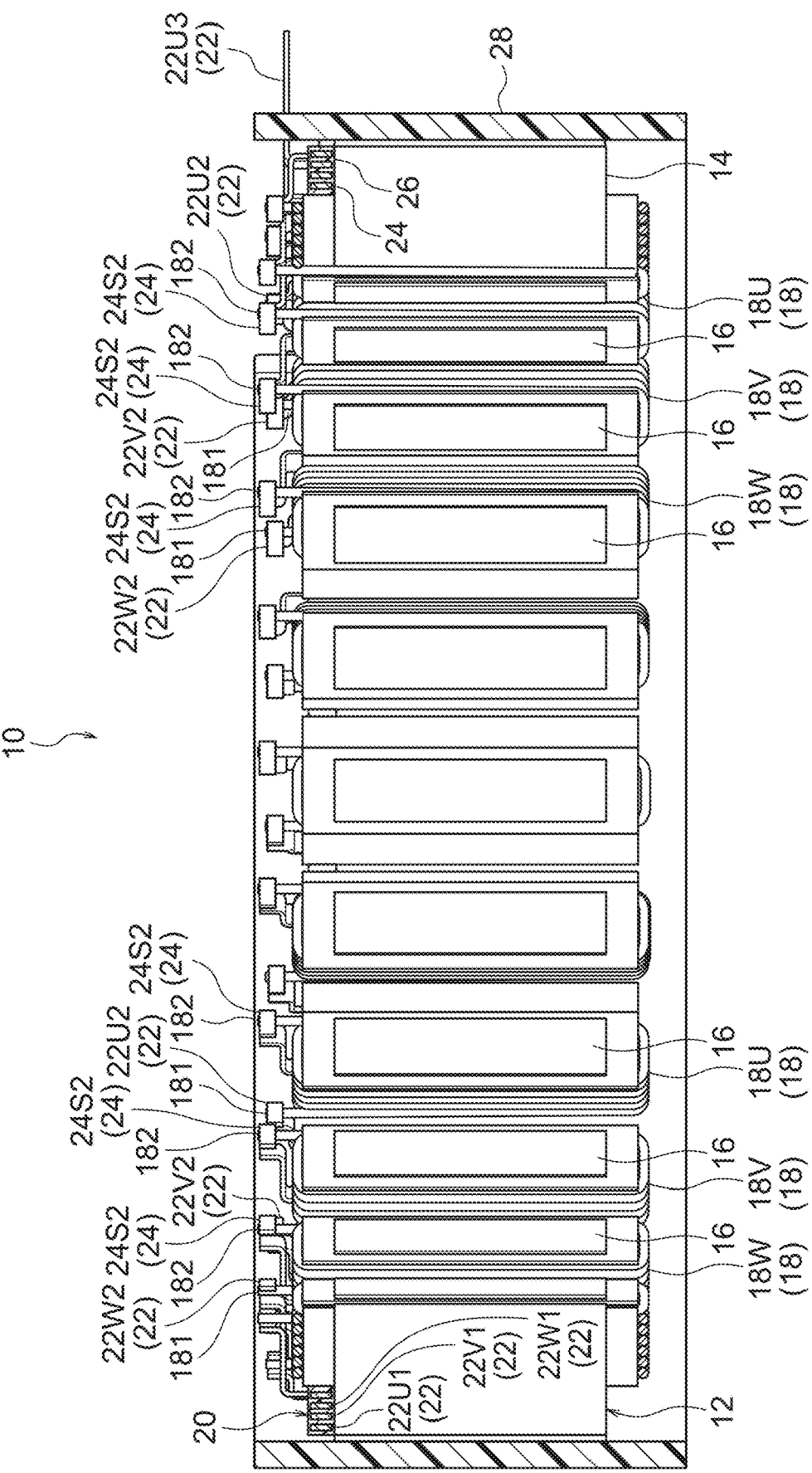
FIG. 3 is a cross-sectional view illustrating the cross-section along line F3-F3 of FIG. 2.
Figure 4:
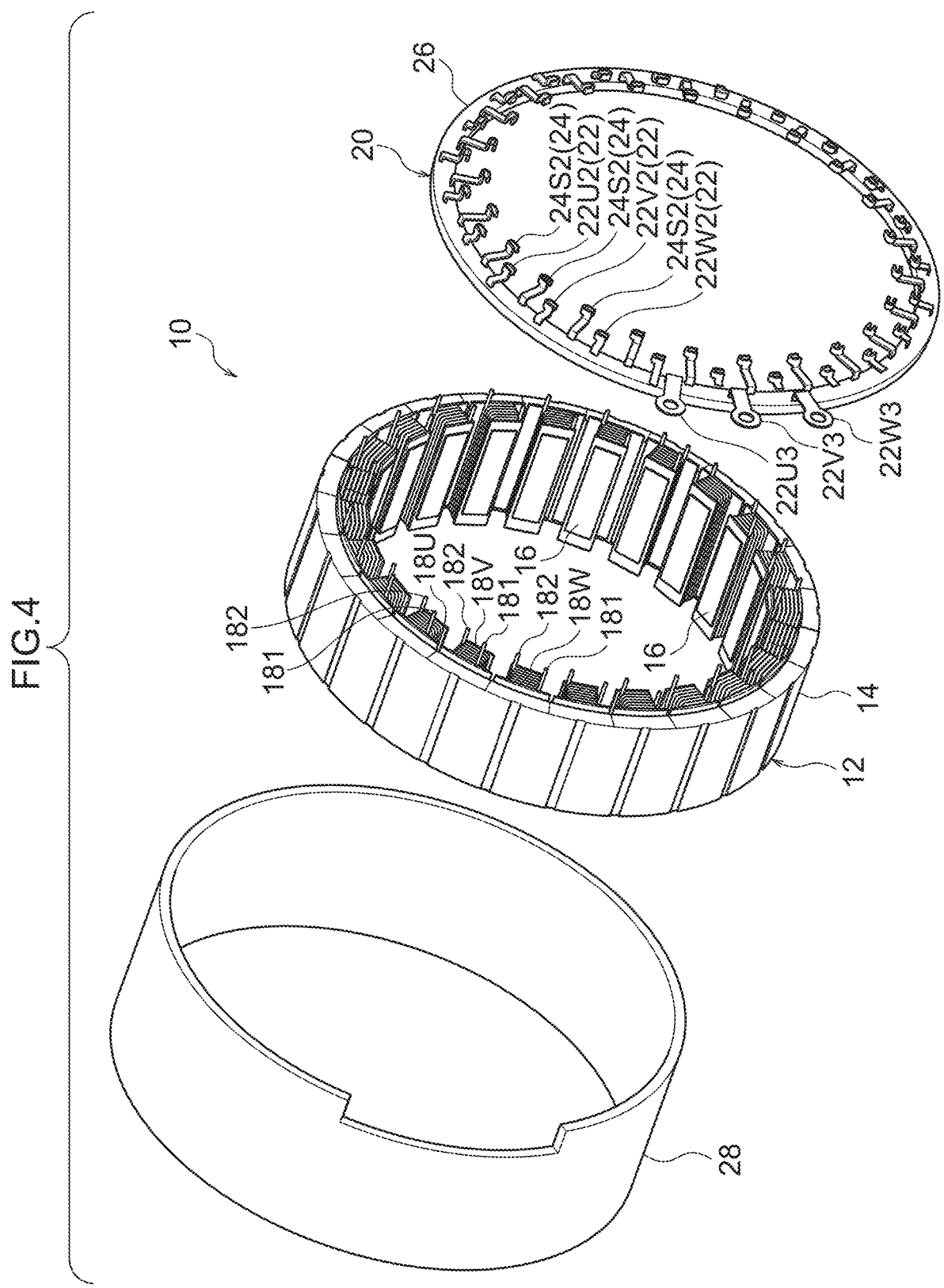
FIG. 4 is an exploded perspective view illustrating the stator relating to the first embodiment.

The U-phase bus bar 22U, the V-phase bus bar 22V, and the W-phase bus bar 22W respectively have first extending portions 22U1, 22V1, 22W1 that extend in annular forms in the peripheral direction of the stator core 12 along the yoke 14, and plural first joining portions 22U2, 22V2, 22W2 that extend out from the first extending portions 22U1, 22V1, 22W1 toward the root sides of the respective teeth 16. Moreover, the U-phase bus bar 22U, the V-phase bus bar 22V, and the W-phase bus bar 22W have a U-phase terminal portion 22U3, a V-phase terminal portion 22V3 and a W-phase terminal portion 22W3 (see FIG. 1. FIG. 2 and FIG. 4) that extend out from the first extending portions 22U1, 22V1, 22W1 toward the radial direction outer side of the stator core 12. Note that the U-phase terminal portion 22U3, the V-phase terminal portion 22V3 and the W-phase terminal portion 22W3 may be structured so as to extend out from the first extending portions 22U1, 22V1, 22W1 toward the axial direction outer side of the stator core 12.

The first extending portion 22U1 of the U-phase bus bar 22U, the first extending portion 22V1 of the V-phase bus bar 22V, and the first extending portion 22W1 of the W-phase bus bar 22W are disposed concentrically with the stator core 12. The first extending portion 22U1, the first extending portion 22V1, and the first extending portion 22W1 are lined-up in that order from the radial direction outer side of the stator core 12 with intervals therebetween. As seen from the axial direction of the stator core 12, the first extending portions 22U1, 22V1, 22W1 are disposed at a region overlapping the yoke 14. Note that the above-described positional relationship of the first extending portion 22U1, the first extending portion 22V1, and the first extending portion 22W1 in the radial direction of the stator core 12 is merely an example, and can be changed appropriately.

The first joining portions 22U2, 22V2, 22W2 extend from the first extending portions 22U1, 22V1, 22W1 toward the side opposite the stator core 12 for a bit, and thereafter, are bent toward the radial direction inner side of the stator core 12, and the respective distal end portions thereof are disposed in vicinities of the roots of the respective teeth 16. First insertion portions 23 are formed respectively at the distal end portions of the first joining portions 22U2, 22V2, 22W2. As seen from the axial direction of the stator core 12, the respective first insertion portions 23 are formed in U shapes whose one sides, in the peripheral direction of the stator core 12, are open. The one end portions 181 of the respective coils 18 are inserted in the inner sides of the respective first insertion portions 23, and the respective first insertion portions 23 and the one end portions 181 of the respective coils 18 are joined by means such as welding or the like. Note that there may be a structure in which the first insertion portions 23 are not formed at the respective distal end portions of the first joining portions 22U2, 22V2, 22W2.

Each of the plural bus bar segments 24S that structure the second bus bar 24 has a second extending portion 24S1 that extends in a circular-arc shape in the peripheral direction of the stator core 12 along the yoke 14, and plural (here, three) second joining portions 24S2 that extend out from the second extending portion 24S1 toward the distal end sides of the respective teeth 16. The second extending portions 24S1 are disposed at the radial direction inner side of the stator core 12 with respect to the first extending portion 22W1 of the W-phase bus bar 22W with a gap therebetween, and are curved in the shapes of circular arcs that are concentric with the stator core 12.

The plural second joining portions 24S2 extend for a bit from the second extending portions 24S1 toward the side opposite the stator core 12, and thereafter, are bent toward the radial direction inner side of the stator core 12, and the respective distal end portions thereof are disposed in vicinities of the distal ends of the respective teeth 16. Second insertion portions 25 are formed respectively at the distal end portions of the respective second joining portions 24S2. The respective second insertion portions 25 are, as seen from the axial direction of the stator core 12, formed in U shapes whose one sides in the peripheral direction of the stator core 12 are open. The other end portions 182 of the respective coils 18 are inserted in the inner sides of the respective second insertion portions 25, and the respective second insertion portions 25 and the other end portions 182 of the respective coils 18 are joined by means such as welding or the like. Note that there may be a structure in which the second insertion portions 25 are not formed at the distal end portions of the respective second joining portions 24S2. Further, there may be a structure in which the second bus bar 24 is formed integrally without being divided into the plural bus bar segments 24S.

As an example, the insulator 26 is structured of a molded resin, and is formed in an annular shape. This insulator 26 is fit together with the inner side of the case 28. The insulator 26 is, for example, a substance in which a powder of a non-magnetic body is kneaded as a filler with a thermosetting resin such as epoxy resin or the like, or a thermoplastic resin or the like. The insulator 26 is thermally conductive and insulating. The first extending portions 22U1, 22V1, 22W1 of the U-phase bus bar 22U, the V-phase bus bar 22V and the W-phase bus bar 22W, and the second extending portions 24S1 of the plural bus bar segments 24S, are embedded in the insulator 26. The first extending portions 22U1, 22V1, 22W1 of the U-phase bus bar 22U, the V-phase bus bar 22V and the W-phase bus bar 22W, and the second extending portions 24S1 of the plural bus bar segments 24S, are held by this insulator 26.

Note that the structure of the insulator 26 is not limited to the above, and can be changed appropriately. For example, there may be a structure in which plural annular grooves that open toward one side in the axial direction of the stator core 12 are formed concentrically in the insulator 26 that is molded in an annular shape of a resin that is thermally conductive and insulating, and the first extending portions 22U1, 22V1, 22W1 and the second extending portions 24S1 are inserted in and held in these annular grooves. Further, for example, there may be a structure in which an unillustrated insulator, which is interposed between the stator core 12 and the respective coils 18, and the above-described insulator 26 are made integral.

In the stator 10 of the above-described structure, the U-phase terminal portion 22U3, the V-phase terminal portion 22V3 and the W-phase terminal portion 22W3 of the U-phase bus bar 22U, the V-phase bus bar 22V and the W-phase bus bar 22W are connected to a three-phase power source. Due thereto, the stator 10 of the above-described structure functions as the stator of a three-phase motor.

(Operation and Effects)

Operation and effects of the present embodiment are described next.

In the stator 10 of the above-described structure, the coils 18 are respectively wound on the plural teeth 16 of the stator core 12. The one end portions 181 of the respective coils 18 are disposed at the root sides of the respective teeth 16, and the other end portions 182 of the respective coils 18 are disposed at the distal end sides of the respective teeth 16. The first bus bar 22 and the second bus bar 24 are disposed at an axial direction one side with respect to the stator core 12. The first bus bar 22 is structured by the U-phase bus bar 22U, the V-phase bus bar 22V and the W-phase bus bar 22W. The U-phase bus bar 22U, the V-phase bus bar 22V and the W-phase bus bar 22W have the first extending portions 22U1, 22V1, 22W1 that extend in the peripheral direction of the stator core 12 along the yoke 14 of the stator core 12. The plural first joining portions 22U2, 22V2, 22W2 extend out from these first extending portions 22U1, 22V1, 22W1 toward the root sides of the respective teeth 16. The one end portions 181 of the respective coils 18 are joined to the distal end portions of the plural first joining portions 22U2, 22V2, 22W2.

The second bus bar 24 is structured by the plural bus bar segments 24S. The respective bus bar segments 24S have the second extending portions 24S1 that extend in the peripheral direction of the stator core 12 along the yoke 14. The plural second joining portions 24S2 extend out from the second extending portions 24S1 toward the distal end sides of the respective teeth 16. The other end portions 182 of the respective coils 18 are joined to the plural second joining portions 24S2. In this way, because the second joining portions 24S2 of the second bus bar 24 extend out (are lengthened) toward the distal end sides of the teeth 16 and are joined to the other end portions 182 of the respective coils 18, a process for routing the other end portions 182 of the respective coils 18, which have been wound around to the distal end sides of the teeth 16, to the outer peripheral side of the yoke 14 (a process for correcting the positions of the coil ends) is unnecessary.

As a result, the manufacturing processes can be simplified, and a reduction in the manufacturing cost is possible. Further, because a deterioration in the dimensions of the other end portions 182 (the coil ends) of the respective coils 18 due to the other end portions 182 being routed to the outer peripheral side of the yoke 14 does not arise, the coils 18 can be assembled to the stator core 12 with the winding accuracy of the coils 18 maintained. Moreover, routing of the other end portions 182 of the coils 18 is unnecessary, and the other end portions 182 of the coils 18 can be maintained at the positions at which they were located at the time of winding Therefore, the positions of the other end portions 182 are stable. Due thereto, joining (e.g., welding) of the other end portions 182 and the second joining portions 24S2 can be carried out stably. Further, if the coils 18 are thick wires and the number of windings thereof is small, or if there are restrictions on the space, there are cases in which the one end portions 181 and the other end portions 182 of the coils 18 cannot be disposed at the outer peripheral side of the yoke 14. However, in the present embodiment, because there is no need to place the other end portions 182 at the outer peripheral side of the yoke 14, the structure of the present embodiment is preferable.

Further, in the present embodiment, the first insertion portions 23, into which the one end portions 181 of the coils 18 are inserted, are formed at the first joining portions 22U2, 22V2, 22W2 of the first bus bar 22. The second insertion portions 25, into which the other end portions 182 of the coils 18 are inserted, are formed at the second joining portions 24S2 of the second bus bar 24. Because the positional relationship of the one end portions 181 and the other end portions 182 of the coils 18, and the first joining portions 22U2, 22V2, 22W2 and the second joining portions 24S2, are stable owing to this insertion, the work of joining the one end portions 181 and the other end portions 182, and the first joining portions 22U2, 22V2, 22W2 and the second joining portions 24S2, is stable.

Further, in the present embodiment, both the first bus bar 22 and the second bus bar 24 are collectively disposed at one side in the axial direction with respect to the stator core 12. Due thereto, as compared with a case in which the first bus bar 22 and the second bus bar 24 are disposed so as to be dispersed at the both sides in the axial direction with respect to the stator core 12, a unit of the first bus bar 22 and the second bus bar 24 can be made integral, and the manufacturing cost can be reduced. Further, because the joining of the respective bus bars 22, 24 and the respective coils 18 can be carried out at only one axial direction side of the stator core 12, the assembly processes and the setting-up of the stator 10 can be simplified.

Further, in the present embodiment, the U-phase bus bar 22U, the V-phase bus bar 22V and the W-phase bus bar 22W that structure the first bus bar 22, and the plural bus bar segments 24S that structure the second bus bar 24, are collectively held by the insulator 26 that is insulating and thermally conductive. The heat of the first bus bar 22 and the second bus bar 24 can be dissipated via this insulator 26.

Second Embodiment

A second embodiment of the present disclosure is described next. Note that structures and operations that are basically similar to those of the first embodiment are denoted by the same reference numerals as in the first embodiment, and description thereof is omitted.

Figure 7:
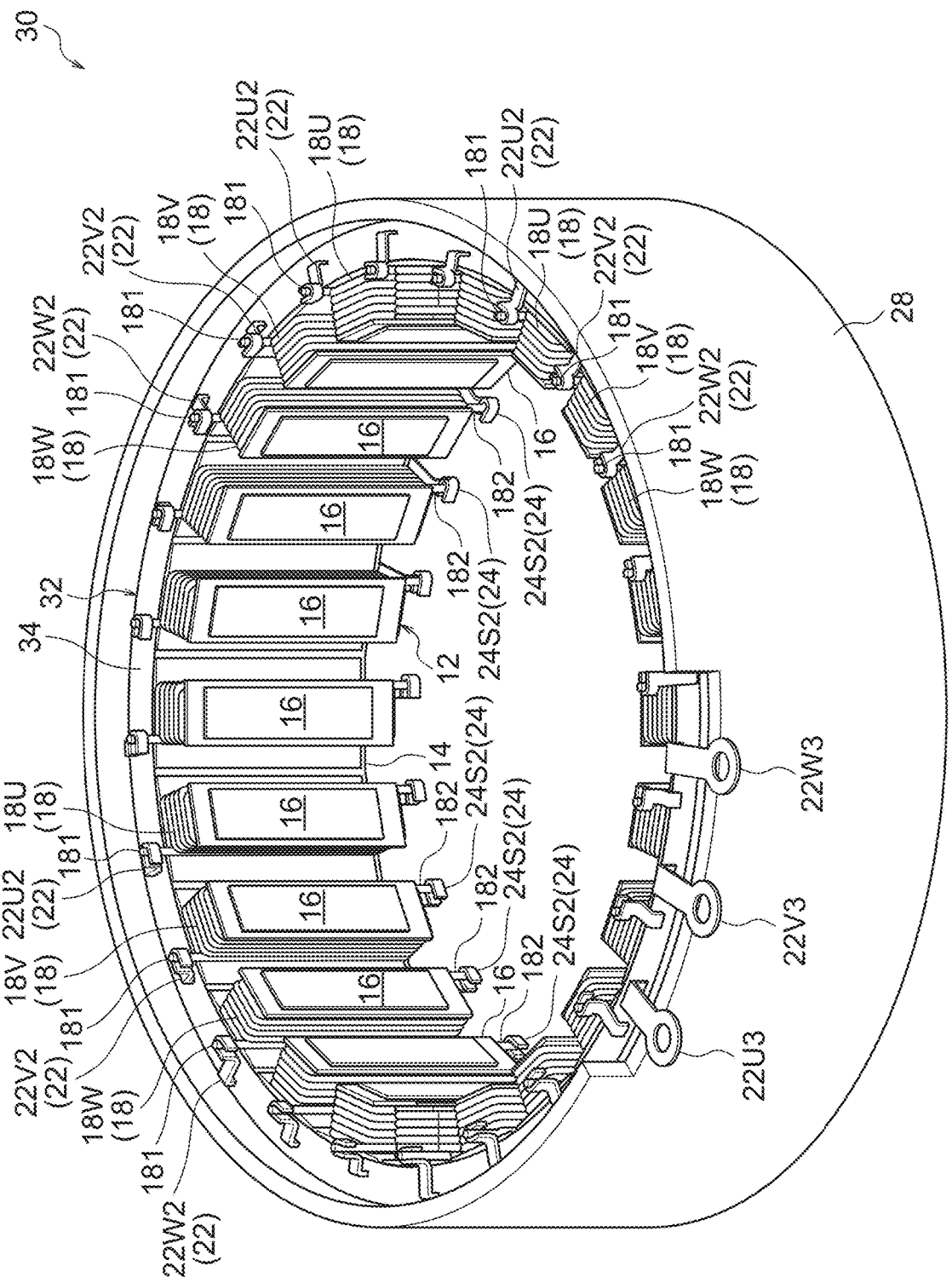
FIG. 7 is a perspective view illustrating a stator relating to a second embodiment.
Figure 8:
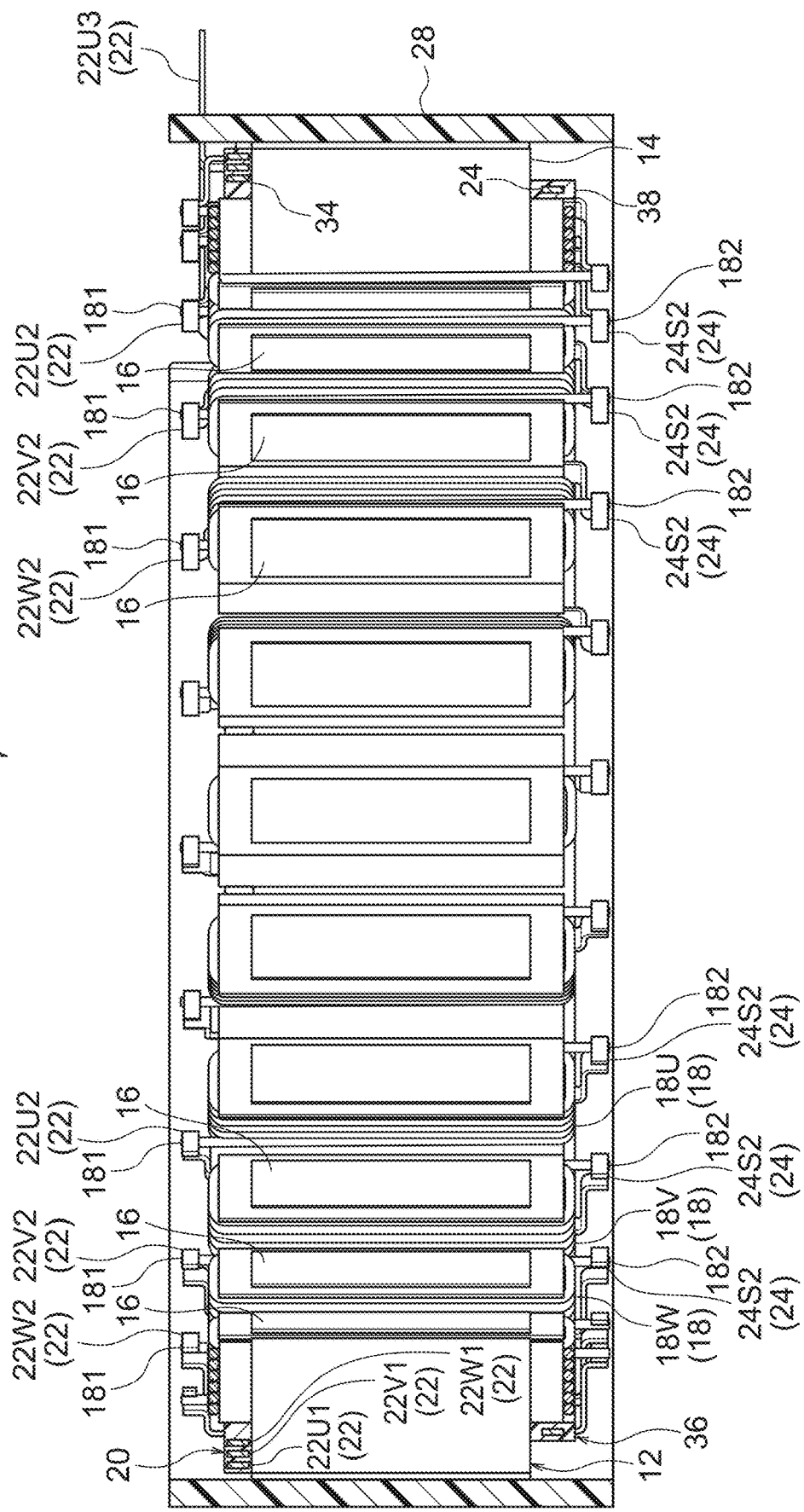
FIG. 8 is a cross-sectional view that is similar to FIG. 3 and illustrates the stator relating to the second embodiment.
Figure 9:
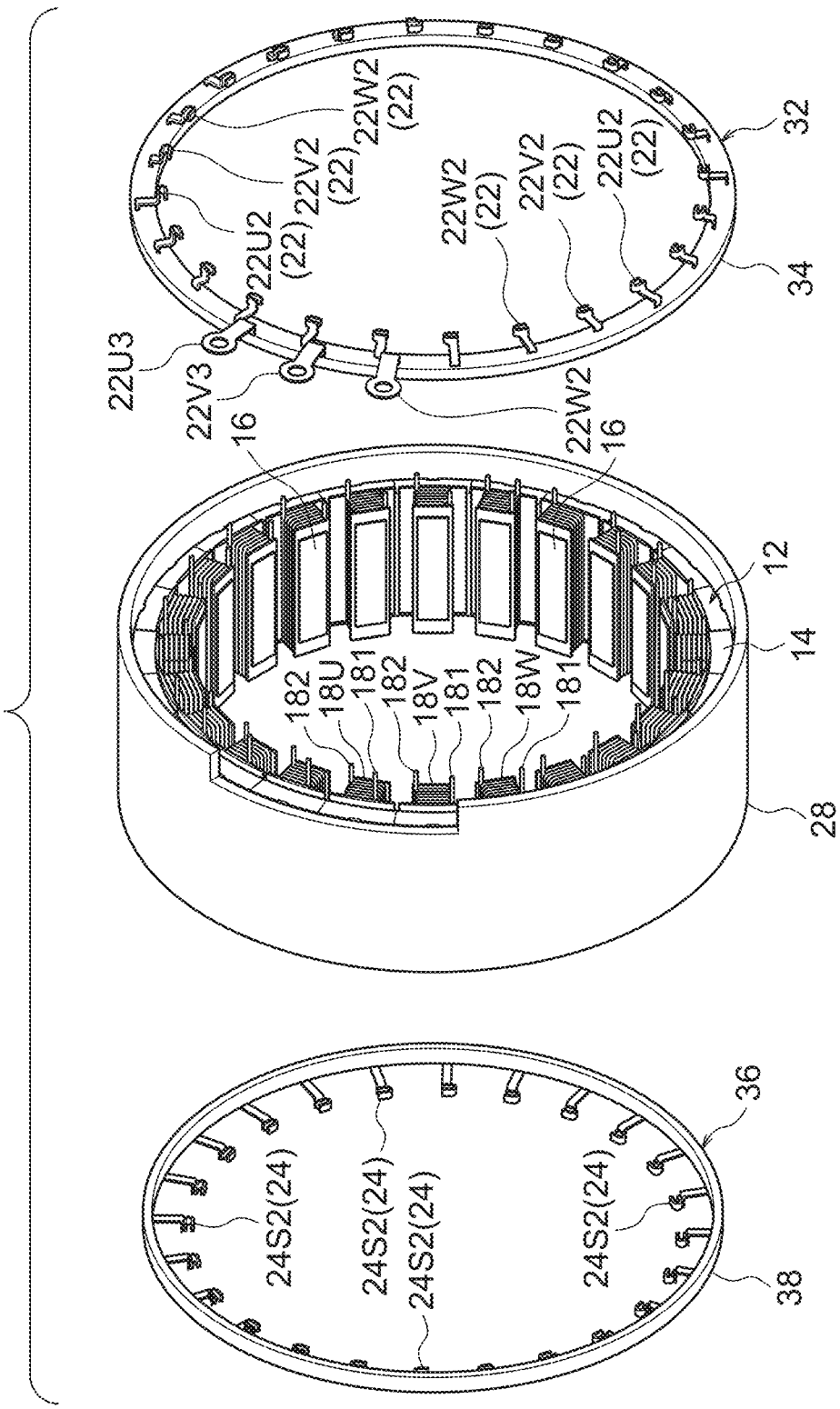
FIG. 9 is an exploded perspective view illustrating the stator relating to the second embodiment.

As illustrated in FIG. 7 through FIG. 9, in a stator 30 relating to the second embodiment, the one end portions 181 of the respective coils 18 that are disposed at the root sides of the respective teeth 16 extend toward one side in the axial direction of the stator core 12, and the other end portions 182 of the respective coils 18 that are disposed at the distal end sides of the respective teeth 16 extend toward the another side in the axial direction of the stator core 12. In this stator 30, a first bus bar unit 32 is disposed at an axial direction one side with respect to the stator core 12, and a second bus bar unit 36 is disposed at an axial direction another side with respect to the stator core 12.

Figure 10:
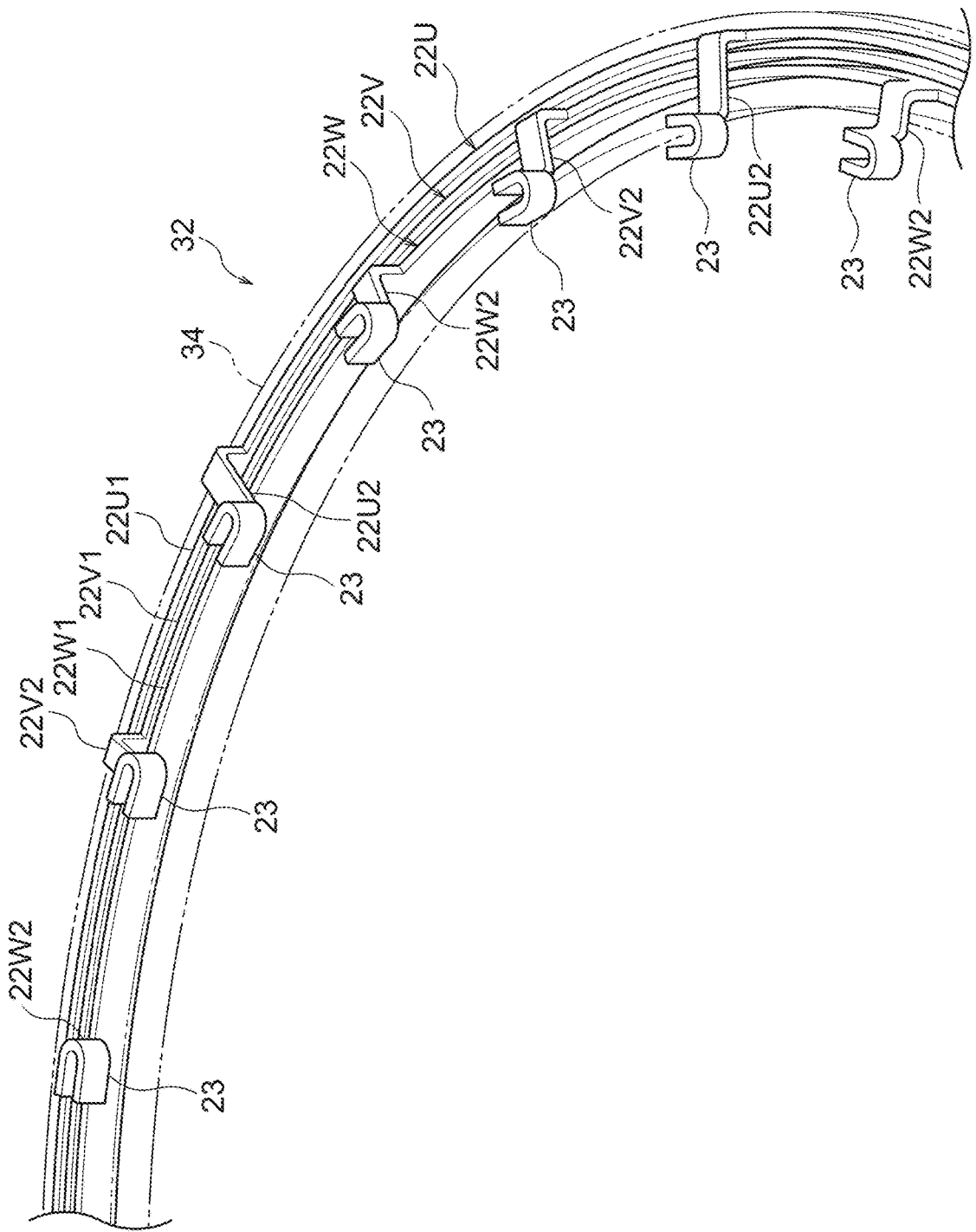
FIG. 10 is a perspective view illustrating a portion of a first bus bar unit of the stator relating to the second embodiment.

As illustrated in FIG. 10, the first bus bar unit 32 is structured by the first bus bar 22 and a first insulator 34. The first bus bar 22 is structured by the U-phase bus bar 22U, the V-phase bus bar 22V and the W-phase bus bar 22W in the same way as in the first embodiment, and the first insulator 34 is basically structured similarly to the insulator 26 relating to the first embodiment. The first extending portions 22U1, 22V1, 22W1 of the U-phase bus bar 22U, the V-phase bus bar 22V and the W-phase bus bar 22W are embedded and held in the first insulator 34. The first insertion portions 23 are respectively formed at the distal end portions of the plural first joining portions 22U2, 22V2, 22W2 of the U-phase bus bar 22U, the V-phase bus bar 22V and the W-phase bus bar 22W. The one end portions 181 of the respective coils 18 are inserted in and joined to the respective first insertion portions 23.

As illustrated in FIG. 11, the second bus bar unit 36 is structured by the second bus bar 24 and a second insulator 38. The second bus bar 24 is structured by the plural bus bar segments 24S in the same way as in the first embodiment, and the second insulator 38 is basically structured similarly to the insulator 26 relating to the first embodiment. The second extending portions 24S1 of the plural bus bar segments 24S are embedded and held in the second insulator 38. The second insertion portions 25 are respectively formed at the distal end portions of the plural second joining portions 24S2 of the plural bus bar segments 24S. The other end portions 182 of the respective coils 18 are joined to the respective second insertion portions 25. In this embodiment, structures other than those described above are similar to the first embodiment.

In this embodiment as well, the plural bus bar segments 24S of the second bus bar 24 have the plural second joining portions 24S2 that extend out from the second extending portions 24S1 toward the distal end sides of the respective teeth 16, and the other end portions 182 of the respective coils 18 that are disposed at the distal end sides of the respective teeth 16 are joined to the distal end portions of the respective second joining portions 24S2. In this way, the second joining portions 24S2 of the second bus bar 24 extend out (are lengthened) toward the distal end sides of the teeth 16 and are joined to the other end portions 182 of the respective coils 18, and therefore, a process for routing the other end portions 182 of the respective coils 18, which have been wound around to the distal end sides of the teeth 16, to the outer peripheral side of the yoke 14 is unnecessary.

Further, in this embodiment, the first bus bar 22 is disposed at an axial direction one side with respect to the stator core 12, and the second bus bar 24 is disposed at an axial direction another side with respect to the stator core 12. Because the first bus bar 22 and the second bus bar 24 are disposed so as to be dispersed at the both sides in the axial direction with respect to the stator core 12 in this way, it is easy to cool the first bus bar 22 and the second bus bar 24.

Further, in this embodiment, the first extending portions 22U1, 22V1, 22W1 of the first bus bar 22 that is disposed at an axial direction one side with respect to the stator core 12 are held by the first insulator 34 that is insulating and thermally conductive. The second extending portions 24S1 of the second bus bar 24 that is disposed at an axial direction another side with respect to the stator core 12 are held by the second insulator 38 that is insulating and thermally conductive. The heat of the first bus bar 22 and the second bus bar 24 can be dissipated via these first insulator 34 and second insulator 38.

Although the present disclosure has been described above by exemplifying two embodiments, the present disclosure can be implemented by being modified within a scope that does not depart from the gist thereof. Further, the scope of the right of the present disclosure is, of course, not limited by the above-described respective embodiments.

The disclosure of Japanese Patent Application No. 2021-017703 filed on Feb. 5, 2021 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A stator, comprising:
a stator core having a yoke and a plurality of teeth;
a plurality of coils wound around the plurality of teeth respectively, respective one end portions of the plurality of coils being disposed at root sides of the teeth respectively, and respective other end portions of the plurality of coils being disposed at distal end sides of the teeth respectively;
a first bus bar disposed at an axial direction one side with respect to the stator core, having a first extending portion extending in a peripheral direction of the stator core along the yoke, and having a plurality of first joining portions that extend out from the first extending portion toward the root sides of the teeth respectively and to which the one end portions of the coils are joined respectively, wherein the first extending portion is disposed on the yoke; and
a second bus bar disposed in an axial direction with respect to the stator core, having a second extending portion extending in the peripheral direction of the stator core along the yoke, and having a plurality of second joining portions that extend out from the second extending portion toward the distal end sides of the teeth respectively and to which the other end portions of the coils are joined respectively,
wherein the first bus bar is made of a metal material and configured to electrically connect the coils.

2. The stator of claim 1, wherein the second bus bar is disposed at an axial direction another side with respect to the stator core.

3. The stator of claim 2, comprising:
a first insulator that is insulating and thermally conductive, and that holds the first extending portion; and
a second insulator that is insulating and thermally conductive, and that holds the second extending portion.

4. The stator of claim 1, wherein the second bus bar is disposed at the axial direction one side with respect to the stator core.

5. The stator of claim 4, comprising an insulator that is insulating and thermally conductive, and that holds the first extending portion and the second extending portion.

6. The stator of claim 1, wherein:
a U-phase coil, a V-phase coil and a W-phase coil are included in the plurality of coils,
a U-phase bus bar, a V-phase bus bar and a W-phase bus bar are included in the first bus bar, and
the U-phase bus bar, the V-phase bus bar and the W-phase bus bar have a U-phase terminal portion, a V-phase terminal portion and a W-phase terminal portion respectively, which are connected to a three-phase power source.

7. The stator of claim 2, wherein:
a U-phase coil, a V-phase coil and a W-phase coil are included in the plurality of coils,
a U-phase bus bar, a V-phase bus bar and a W-phase bus bar are included in the first bus bar, and
the U-phase bus bar, the V-phase bus bar and the W-phase bus bar have a U-phase terminal portion, a V-phase terminal portion and a W-phase terminal portion respectively, which are connected to a three-phase power source.

8. The stator of claim 3, wherein:
a U-phase coil, a V-phase coil and a W-phase coil are included in the plurality of coils,
a U-phase bus bar, a V-phase bus bar and a W-phase bus bar are included in the first bus bar, and
the U-phase bus bar, the V-phase bus bar and the W-phase bus bar have a U-phase terminal portion, a V-phase terminal portion and a W-phase terminal portion respectively, which are connected to a three-phase power source.

9. The stator of claim 4, wherein:
a U-phase coil, a V-phase coil and a W-phase coil are included in the plurality of coils,
a U-phase bus bar, a V-phase bus bar and a W-phase bus bar are included in the first bus bar, and
the U-phase bus bar, the V-phase bus bar and the W-phase bus bar have a U-phase terminal portion, a V-phase terminal portion and a W-phase terminal portion respectively, which are connected to a three-phase power source.

10. The stator of claim 5, wherein:
a U-phase coil, a V-phase coil and a W-phase coil are included in the plurality of coils,
a U-phase bus bar, a V-phase bus bar and a W-phase bus bar are included in the first bus bar, and
the U-phase bus bar, the V-phase bus bar and the W-phase bus bar have a U-phase terminal portion, a V-phase terminal portion and a W-phase terminal portion respectively, which are connected to a three-phase power source.

11. The stator of claim 1, wherein the second bus bar is made of a metal material and configured to electrically connect the coils.

* * * * *